(12) United States Patent
Wagner

(10) Patent No.: US 8,442,682 B2
(45) Date of Patent: May 14, 2013

(54) AUTONOMOUS ROBOT CHARGING STATIONS AND METHODS

(75) Inventor: David J. Wagner, Mason, OH (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 440 days.

(21) Appl. No.: 12/790,021

(22) Filed: May 28, 2010

(65) Prior Publication Data

US 2011/0295420 A1  Dec. 1, 2011

(51) Int. Cl.
*G06F 19/00* (2011.01)
*H02J 7/02* (2006.01)

(52) U.S. Cl.
USPC ............................................. 700/258; 901/1

(58) Field of Classification Search ............... 700/245, 700/258, 259; 320/109, DIG. 35; 901/1
See application file for complete search history.

(56) References Cited

U.S. PATENT DOCUMENTS

| | | | |
|---|---|---|---|
| 5,332,013 A * | 7/1994 | Sugita et al. .................... | 141/98 |
| 6,764,373 B1 * | 7/2004 | Osawa et al. .................. | 446/175 |
| 7,274,166 B2 | 9/2007 | Kim | |
| 7,376,487 B2 | 5/2008 | Kumhyr | |
| 7,397,213 B2 | 7/2008 | Im et al. | |
| 7,560,071 B2 | 7/2009 | Nichols et al. | |
| 7,825,633 B2 * | 11/2010 | Udono ........................... | 320/137 |
| 7,861,366 B2 * | 1/2011 | Hahm et al. .................... | 15/319 |
| 7,894,940 B2 * | 2/2011 | Kumhyr ......................... | 700/248 |
| 8,212,533 B2 * | 7/2012 | Ota ................................. | 320/162 |
| 2002/0129707 A1 * | 9/2002 | Tanaka et al. ................... | 95/273 |
| 2005/0113972 A1 * | 5/2005 | Kumhyr ......................... | 700/245 |
| 2005/0126081 A1 * | 6/2005 | Patel et al. ..................... | 52/2.11 |
| 2007/0299549 A1 | 12/2007 | Kumhyr | |
| 2008/0007203 A1 * | 1/2008 | Cohen et al. ................... | 320/104 |
| 2008/0012518 A1 | 1/2008 | Yamamoto | |
| 2008/0042620 A1 * | 2/2008 | Udono ........................... | 320/137 |
| 2008/0231227 A1 * | 9/2008 | Kumhyr ......................... | 320/106 |
| 2008/0238365 A1 * | 10/2008 | Kaneko et al. ................. | 320/109 |
| 2009/0177320 A1 | 7/2009 | Lee et al. | |
| 2010/0010672 A1 | 1/2010 | Wang et al. | |
| 2010/0322747 A1 * | 12/2010 | Lert et al. ....................... | 414/273 |
| 2011/0066515 A1 * | 3/2011 | Horvath et al. ................. | 705/17 |
| 2011/0067615 A1 * | 3/2011 | Rooney et al. ................. | 114/222 |

* cited by examiner

*Primary Examiner* — Khoi Tran
*Assistant Examiner* — Jason Holloway
(74) *Attorney, Agent, or Firm* — Dinsmore & Shohl LLP

(57) ABSTRACT

A method of charging a robotic device using a charging station is provided. The method includes signaling a controller of the charging station to actuate a moveable barrier of the charging station from a closed configuration to an open configuration. The charging station is recessed into a wall, ceiling and/or floor. The moveable barrier is actuated from the closed configuration to the open configuration thereby exposing an electrical contact of the charging station configured to engage a charging contact of the robotic device for a charging operation.

17 Claims, 7 Drawing Sheets

_US 8,442,682 B2_

AUTONOMOUS ROBOT CHARGING STATIONS AND METHODS

TECHNICAL FIELD

The present specification generally relates to robotic systems, and more particularly to charging stations and methods for use in charging autonomous robots.

BACKGROUND

Automated robotic systems are being increasingly used in a variety of environments to assist humans with any number of tasks. Robotic systems may be useful in performing, for example, repetitive tasks, tasks requiring precision, dangerous tasks, and the like. In some cases, autonomous robots may be used in the home, workplace, hospital environment, etc. to aid humans in everyday tasks, such as transportation, household chores, and the like.

Typically, automated robots have some form of power source that is used to supply power to the robot's electrical systems. In some instances, such power sources may be rechargeable. Often, a charging station may be provided with which the robot can dock for a charging operation. These charging stations often occupy floor space and can provide an obstruction to humans and to the robot itself. There is a need for robot charging stations that minimize space requirements while providing ample docking structure to accommodate autonomous docking between the robot and the charging station.

SUMMARY

In one embodiment, a method of charging a robotic device using a charging station is provided. The method includes signaling a controller of the charging station to actuate a moveable barrier of the charging station from a closed configuration to an open configuration, the charging station being recessed into a wall, ceiling and/or floor; and actuating the moveable barrier from the closed configuration to the open configuration thereby exposing an electrical contact of the charging station configured to engage a charging contact of the robotic device for a charging operation.

In another embodiment, a robotic system includes a robotic device including a controller and a charging contact. A charging station includes a housing configured to be recessed into a wall, floor and/or ceiling, mounting structure for mounting the housing to the wall, floor and/or ceiling, and a moveable barrier having a closed configuration where an electrical contact of the charging station is at least partially enclosed within the housing for preventing access to the electrical contact by the robotic device and an open configuration for allowing access to the electrical contact by the robotic device.

In another embodiment, a method of assembling a charging station for a robotic device is provided. The method includes mounting a moveable barrier to a housing of the charging station; and operatively connecting an actuator to the moveable barrier to move the moveable barrier from a closed configuration where an electrical contact for a robotic device charging operation is at least partially enclosed within the housing and an open configuration where the electrical contact is exposed for engaging a charging contact of the robotic device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to charging stations and methods for charging autonomous robots. The charging stations may include a moveable barrier having open and closed configurations that allow and inhibit access to various electrical components housed within the charging stations. Additionally, the charging stations may be configured to be recessed within, for example, a wall, ceiling and/or floor of a building to reduce the footprint of the charging stations on the floor.

Figure 1:
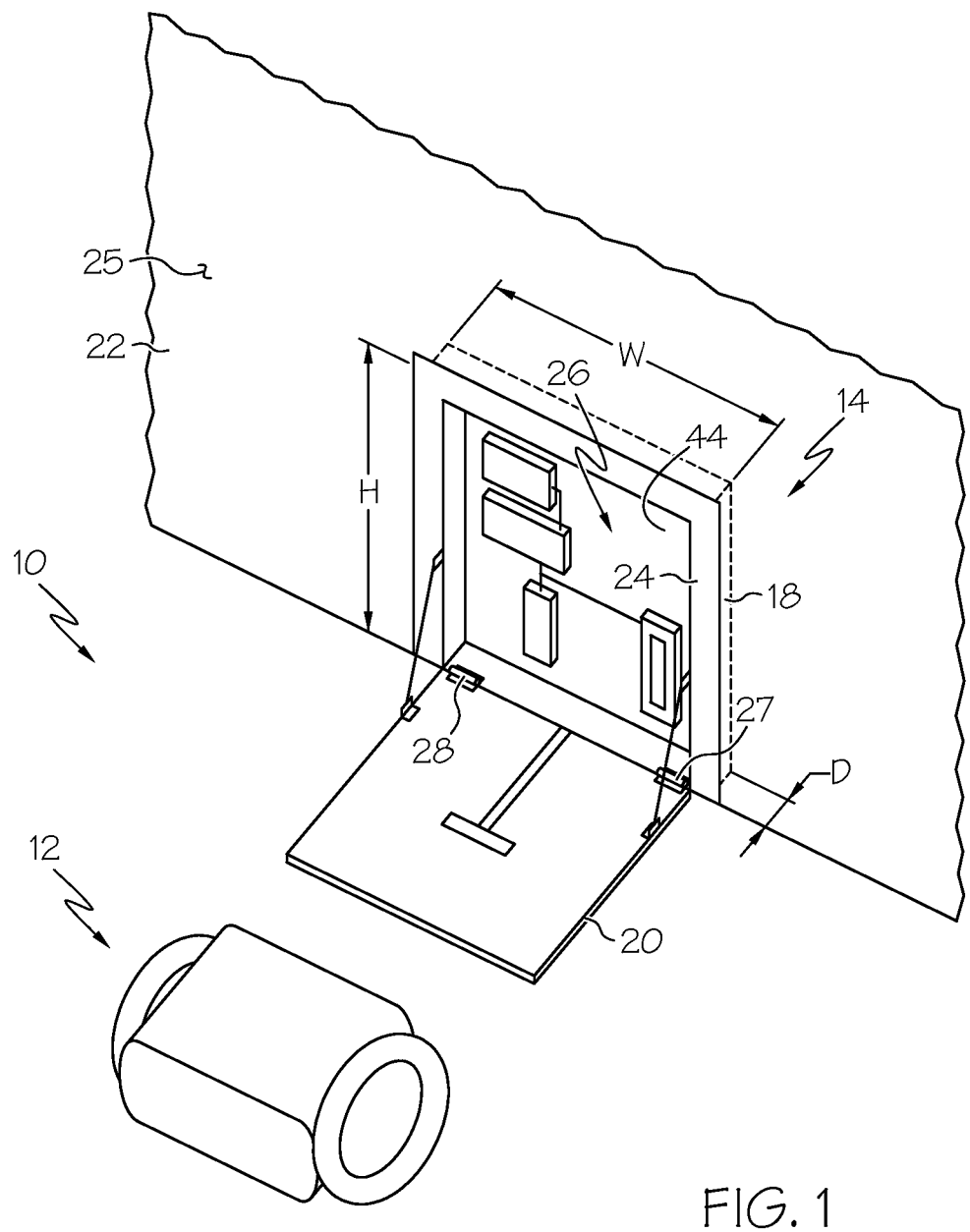
FIG. 1 is a perspective view of a robotic system including a robotic device and charging station according to one or more embodiments shown and described herein.

Referring to FIG. 1, an autonomous robotic system 10 includes a robotic device 12 and a charging station 14. The robotic device 12 may be configured to mate with the charging station 14 for a charging operation, as will be described in greater detail below. The robotic device 12 may be configured for one or more tasks, such as object transportation, lawn mowing, vacuum cleaning, floor sweeping, snow removal, and the like. In some embodiments, the robotic device 12 may be configured to aid in the transportation or movement of humans, such as patients within a hospital, clinic, retirement home, etc. The robotic device 12 may generally include processors, control hardware, software and combinations thereof for controlling the requisite operations of the robotic device 12. The robotic device 12 may also include a power source 16, such as a battery that can be recharged using the charging station 14.

The charging station 14 includes a housing 18 and a moveable barrier 20 (e.g., a gate, door, etc.) that is moveable relative to the housing 18 between open and closed configurations. In FIG. 1, the moveable barrier 20 is illustrated in the open configuration. The housing 18 has a height H, a width W and a depth D where the depth D of the housing 18 is at least partially recessed into the wall 22. In some embodiments, at least about 50 percent, such as at least about 70 percent, such as at least about 90 percent of the depth D is recessed into the wall 22 (i.e., behind surface 25 of the wall 22). In the illustrated embodiment, the housing 18 is somewhat box-shaped with a flange 24 extending about an access opening 26. In other embodiments, the housing 18 may have any other suitable shape, such as a rounded shape. In some embodiments, the flange 24 may be seated against the wall 22 and provide a support structure for supporting the charging station 14 in the wall 22. The flange 24 may include openings for receiving fasteners or other mounting structure for securely mounting the charging station 14 to the wall 22.

Figure 2:
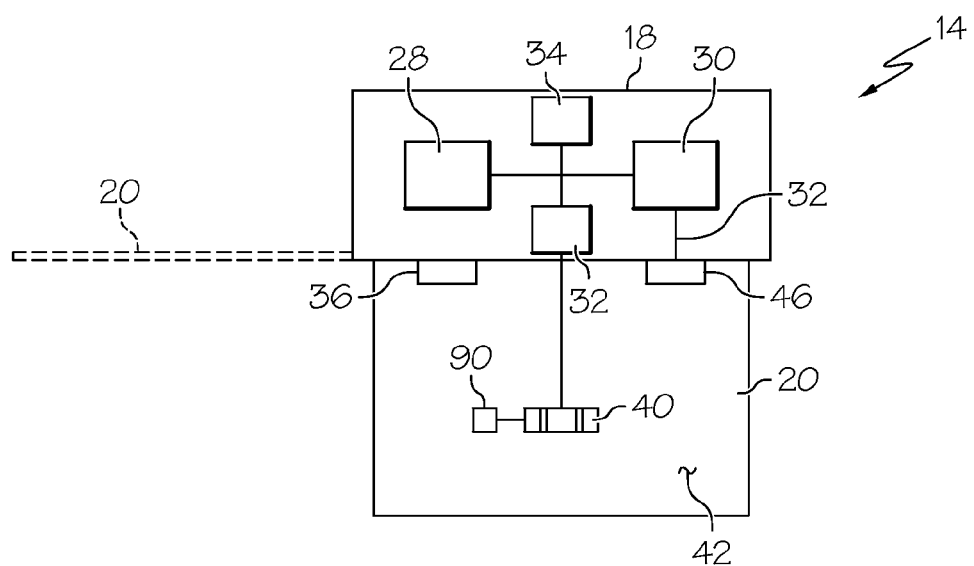
FIG. 2 is a diagrammatic top view of the charging station of FIG. 1 according to one or more embodiments shown and described herein.

Referring to FIG. 2, the charging station 14 includes the moveable barrier 20 that may be mounted to the housing 18. In some embodiments, the moveable barrier 20 may be a door that is pivotally connected to the housing 18, for example, by one or more hinges 27 (FIG. 1) such that the moveable barrier 20 can pivot up and down along a horizontal pivot axis to inhibit access and allow access to the electrical components within the housing 18. In other embodiments, the moveable barrier 20 may be slidably connected to the housing 18, as represented by the dotted lines. In some embodiments, the charging station 14 may include a controller 28 that, among other things, may be programmed and configured to control one or more actuator 30. The actuator 30 (e.g., a motor, hydraulic or pneumatic cylinder, etc.) may be operatively connected to the moveable barrier 20 as represented by connection 31 and configured to automatically move or pivot the moveable barrier 20 between its open and closed configurations. A command may be provided, for example, from the robotic device 12 and/or an operator that causes the controller 28 to move the moveable barrier 20. A wireless communication device 32 may be provided to allow wireless communication between the controller 28 and the robotic device 12. Processes for actuating the moveable barrier 20 and initiating a charging operation are described in greater detail below.

One or more obstacle sensors 34 may be provided for detecting presence of obstacles within or nearby the movement path of the moveable barrier 20. The obstacle sensors 34 may be arranged and configured to survey and assess the surrounding environment of the charging station 14 prior to and/or during the opening and/or closing of the moveable barrier 20. Using contact and/or object proximity sensing capabilities, impending and/or actual contact between the moveable barrier 20 and an obstacle positioned external to charging station 14 within the range or near to the range of motion of the moveable barrier 20, such as an object, animal or human, may be avoided or minimized, with the obstacles being sensed in both the opening and closing direction of the moveable barrier 20. To provide a warning or alert to an operator, an indicator 36 may be positioned on the charging station 14, robotic device 12 and/or other remote device to provide a visible and/or audible alarm or indication when the moveable barrier 20 is about to or actually does make contact an obstacle.

The obstacle sensors 34 may be configured to provide an indication to the controller 28 of the presence of an obstacle. The controller 28 may include programmable memory and include a control algorithm that controls operation of the moveable barrier 20 based, at least in part, on the indication (or lack thereof) provided from the obstacle sensors 34. The one or more obstacle sensors 34 may be contact-type obstacle sensors and/or non-contact-type obstacle sensors (all of which are represented by element 34). Contact-type obstacle sensors may include a door angle sensor, a force sensor, and the like and the non-contact-type obstacle sensors may include laser scanners, sonar sensors, photo eyes, and the like. The door angle sensors may be used to provide information to the controller 28 of the position of the moveable barrier 20, for example, as it moves between its open and closed configurations. Thus, the door angle sensors may be used to detect a change in velocity of the moveable barrier 20, which may be the result of contact with an obstacle. The force sensor may be, for example, a torque sensor that is used to measure torque at the pivot of the moveable barrier. A sudden increase in torque may be the result of contact between the moveable barrier 20 and an obstacle.

The non-contact-type obstacle sensors may be provided in order to detect the presence of an obstacle without requiring physical contact between moveable barrier and the obstacle. Using non-contact-type obstacle sensors, an obstacle may be recognized and reacted to before moveable barrier 20 contacts the obstacle. In addition to the non-contact sensors listed above, other suitable sensors may include ultrasonic sensors and/or optical/camera sensors configured for detecting an obstacle without physical contact between the obstacle and moveable barrier 20. Other non-contact-type obstacle sensors may include radar-based sensors and/or electromagnetic sensors. Non-contact-type sensors may be active in both opening and closing directions of moveable barrier 20 and operable for detecting obstacles positioned within the range of motion of the moveable barrier.

Non-contact-type sensors may have a sufficiently wide field of view to survey the surrounding area of charging station 14 and detect, for example, objects, humans, the robotic device 12, and the like. Using input from sensors 34, the moveable barrier 20 may be permitted to open (or close) to within a minimum predetermined clearance with respect to obstacle, and then stop once that clearance has been reached.

The charging station 14 may include electrical contacts 40 which are sized and located to contact corresponding contacts on the robotic device 12. In the illustrated embodiment, the electrical contacts 40 are located at an interior surface 42 of the moveable barrier 20 such that, with the moveable barrier in the open configuration, the robotic device 12 can move onto the lowered moveable barrier 20 and make repeatable contact between the electrical contacts 40 of the charging station 14 and the electrical contacts on the robotic device 12. The electrical contacts 40 may be located at any other suitable position in or on the charging station 14, such as at the interior wall 44 depending, at least in part, on the location of the corresponding electrical contacts on the robotic device 12 and where the charging station 14 is located in a room.

The housing 18, moveable barrier 20 and interior wall 44 may provide mounting locations for components of the charging station 14, in addition to the sensors 34 and electrical contacts 40. For example, a signal emitter 46 may project one or more signals that can be received by the robotic device 12, such as a homing signal, which can be used by the robotic device 12 in identifying position of the charging station 14 and can be used by the robotic device 12 to align itself during docking with the charging station 14. The robotic device 12 may include a detector 48 (e.g., IR detectors, see FIG. 1) that can be used to receive the signals from the signal emitter 46.

Figure 3:
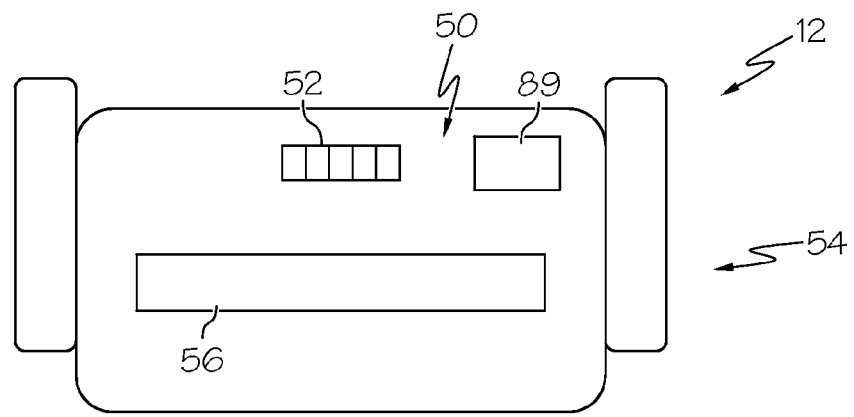
FIG. 3 is a diagrammatic bottom view of the robotic device of FIG. 1 according to one or more embodiments shown and described herein.

FIG. 3 represents an undercarriage 50 of the robotic device 12. The charging contacts 52 may be located on the undercarriage 50 and are sized and located to contact the electrical contacts 40 of the charging station 14. The charging contacts 52 of the robotic device 12 may be larger or smaller than the electrical contacts 40 of the charging station 14 to facilitate electrical contact therebetween. The robotic device 12 may include any suitable motive system 54, such as any combination of motors, wheels, tracks, drive shafts, and the like.

Additionally, the robotic device 12 may include any suitable components 56 for performing one or more tasks, such as padded support structures for transportation of objects, humans, animals, etc., pads for floor waxing and polishing, materials for floor scrubbing, components for ice resurfacing, vacuum components for sweeping and vacuuming, abrasive materials for unfinished floor sanding, brushes for stain/paint application, heating components and blowers for ice melting and snow removal, blades for grass cutting, and the like.

Figure 4:
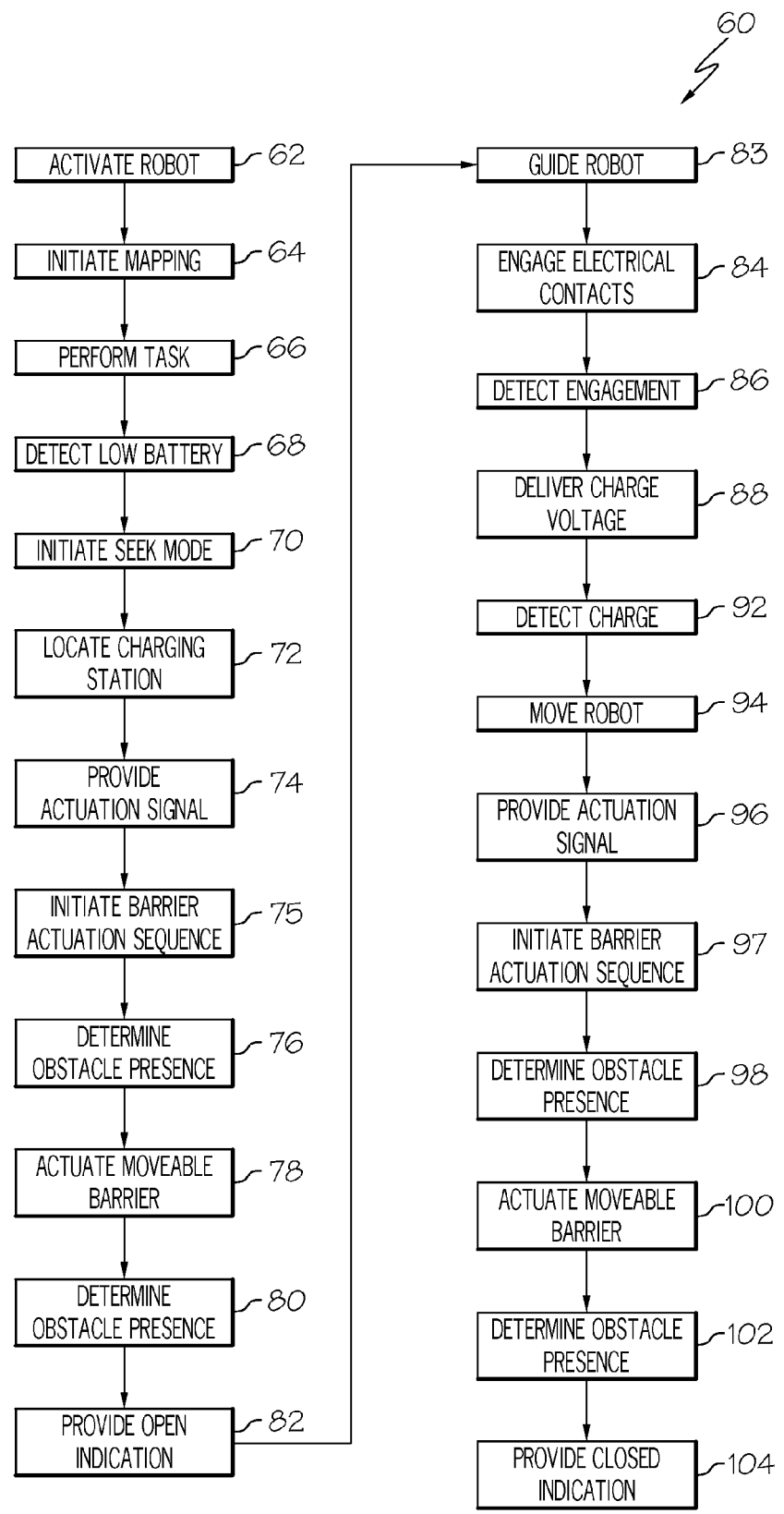
FIG. 4 illustrates a method for charging the robotic device using the charging station of FIG. 1 according to one or more embodiments shown and described herein.

Referring now to FIG. 4, an exemplary embodiment of a method 60 for charging the robotic device 12 using the charging station 14 that is recessed into the wall 22 (FIG. 1) is shown. At step 62, the robotic device 12 may be activated, for example by a user. In some embodiments, the robotic device 12 may be activated in somewhat close proximity to the charging station 14 or even docked with the charging station 14. At step 64, the robotic device 12 may include a mapping algorithm, saved in its memory, during which the robotic device 12 initiates a mapping procedure where the controller 89 (FIG. 3) of the robotic device 12 locates the position of the charging station 14 and then moves in a predetermine pattern to identify position of the charging station 14 within a room. In some embodiments, the controller 89 of the robotic device 12 may use laser sensors to accomplish mapping of objects in the field of view of the robotic device 12. Step 64 may be performed only periodically or even only once (depending on whether objects are being added to the room). The charging station 14 may present a signal, such as the homing signal for use by the controller 89 of the robotic device 12 in identifying position of the charging station 14 in the room.

The robotic device 12 may perform one or more tasks at step 66. While performing tasks, the controller 89 of the robotic device 12 may continue to acquire mapping information. The controller 89 of the robotic device 12 may include control logic for use in controlling behavior of the robotic device 12 while performing its tasks such as spinning, turning and the like.

At step 68, the controller 89 of the robotic device 12 may detect a low battery supply condition. This low battery supply condition may correspond to a preselected amount of battery charge in the power supply of the robotic device 12, such as 25 percent or less as an example. The controller 89 of the robotic device 12 may then initiate a seek mode where the controller 89 of the robotic device 12 utilizes control logic to seek the charging station 14 at step 70. In some embodiments, the controller 89 of the robotic device 12 may look for the homing signal from the emitter 46 of the charging station 14 and utilize the mapping information to locate and move toward the charging station 14. In the seek mode, the controller 89 of the robotic device 12 may conserve energy by powering down nonessential systems. The robotic device 12 may continue in the seek mode until the charging station 14 is located at step 72, which may be accomplished using the mapping information and/or homing signal strength.

At step 74, once the charging station 14 is located, the controller 89 of the robotic device 12 may provide the charging station 14 with an actuation signal that is received by the controller 28 of the charging station 14. Receipt of the actuation signal may cause the controller 28 to initiate a barrier actuation sequence at step 75 during which the controller 28 determines whether any obstacles are present using the obstacle sensors 34 at step 76. In some embodiments, the non-contact sensors may be utilized first to determine presence of an obstacle, without any need for the moveable barrier 20 to contact the obstacle. If the controller 28 determines that no obstacle is present, the controller 28 may move the moveable barrier 20 using the actuator 30 from the closed configuration to the open configuration at step 78. At step 80, the controller 28 continues to look for obstacles as the moveable barrier 20 moves using the obstacle sensors 34 (non-contact and/or contact sensors).

Once the moveable barrier 20 is placed in the open configuration, the controller 28 may indicate such to the controller 89 of the robotic device 12 at step 82. The homing signal may be provided by the emitter 46 of the charging station 14, which can be used by the controller 89 of the robotic device 12 to navigate the robotic device 12 toward the electrical contacts 40. In some embodiments, multiple, overlapping homing signals may be provided to guide the robotic device 12 toward the electrical contacts 40. In some embodiments, the robotic device 12 is guided upon the inner surface of the moveable barrier 20 to reach the electrical contacts 40 at step 83.

At step 84, the charging contacts 52 of the robotic device 12 contact the electrical contacts 40 of the charging station 14. While the robotic device 12 is off or away from the electrical contacts 40 of the charging station 14, the electrical contacts 40 may present a minimal voltage to limit any potential short circuit current flow. In other embodiments, the electrical contacts 40 may present no voltage, for example, until presence of the robotic device 12 is detected at the electrical contacts 40. The charging contacts 52 of the robotic device 12 may present a resistive load when in contact with the electrical contacts of the charging station 14 that can be detected by the controller 28 of the charging station 14 at step 86. The controller 28 of the charging station 14 may then turn on a transistor switch for delivering a higher voltage charge to the electrical contacts 40 that is used to charge the power supply of the robotic device 12 at step 88. In another embodiment, the charging station 14 may include a force sensor 90 (FIG. 2) that is used to detect presence of the robotic device 12 at the electrical contacts 40.

Once the robotic device 12 is charged—a condition that may be detected by the controller 89 of the robotic device 12 and/or the charging station 14 at step 92—the robotic device 12 may remain on the charging station 14, for example, until reactivated by the user. In some embodiments, the robotic device 12, once charged and/or activated, may move away from the charging station 14 and off the moveable barrier 20 at step 94. At step 96, once the robotic device 12 clears the moveable barrier 20, the controller 89 of the robotic device 12 may provide another actuation signal to the controller 28 of the charging station 14. In another embodiment, the controller 28 of the charging station 14 may determine when the robotic device 12 clears the moveable barrier 20, for example, using the obstacle sensors 34. Receipt of the actuation signal may cause the controller 28 to initiate a barrier actuation sequence 97 during which the controller 28 determines whether any obstacles are present using the obstacle sensors 34 at step 98. In some embodiments, the non-contact sensors may be utilized first to determine presence of an obstacle, without any need for the moveable barrier 20 to contact the obstacle. If the controller 28 determines that no obstacle is present, the controller 28 may move the moveable barrier 20 using the actuator 30 from the open configuration to the closed configuration at step 100. At step 102, the controller 28 may continue to look for obstacles as the moveable barrier 20 moves using the obstacle sensors 34 (non-contact and/or contact sensors). In some embodiments, the controller 28 of the charging station 14 may provide an indication to the robotic device 12 that the moveable barrier is in its closed configuration.

Figure 5:
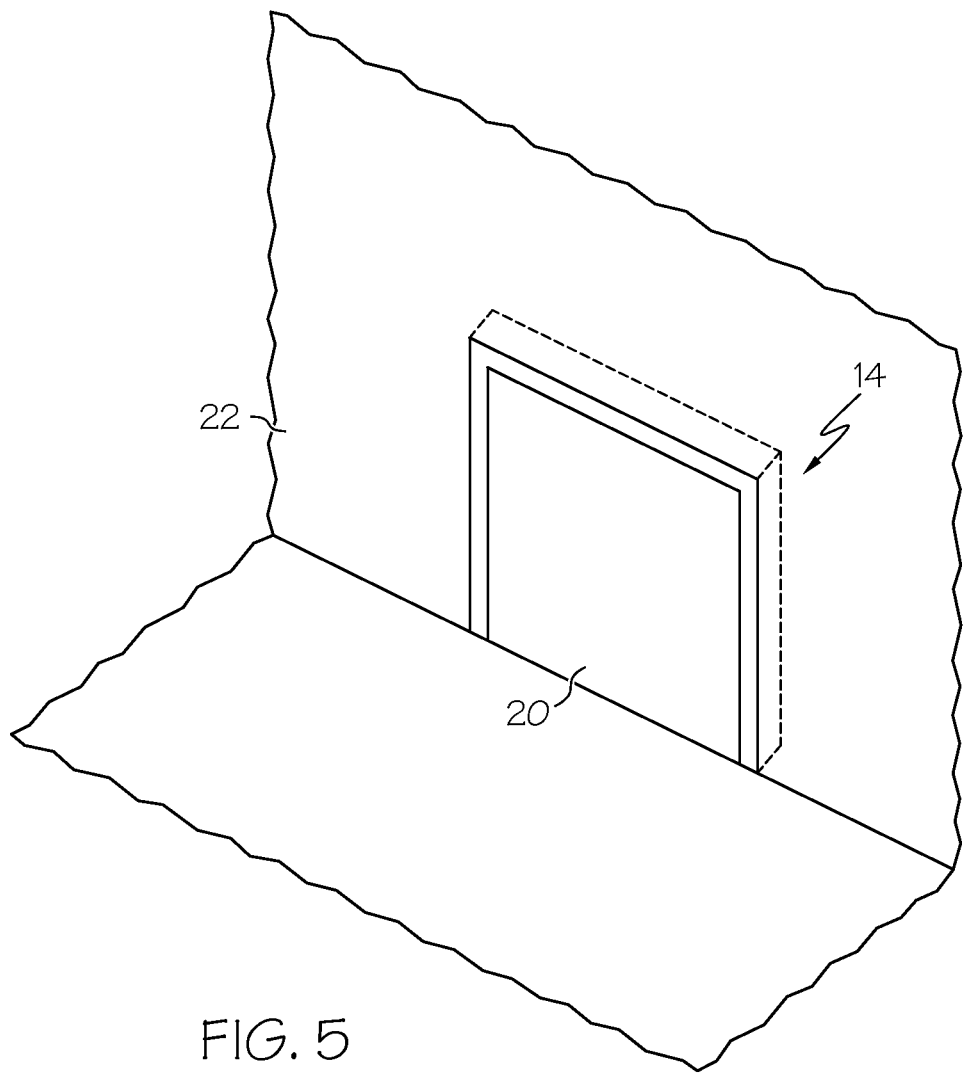
FIG. 5 illustrates the charging device of FIG. 1 in a closed configuration.

Referring to FIG. 5, when the moveable barrier 20 is placed in its closed configuration, the charging station 14 appears to be part of the wall 22. Such recessed, closed configuration can reduce the footprint of the charging stations on the floor and inhibit contact with electrical components of the charging station 14.

Figure 6:
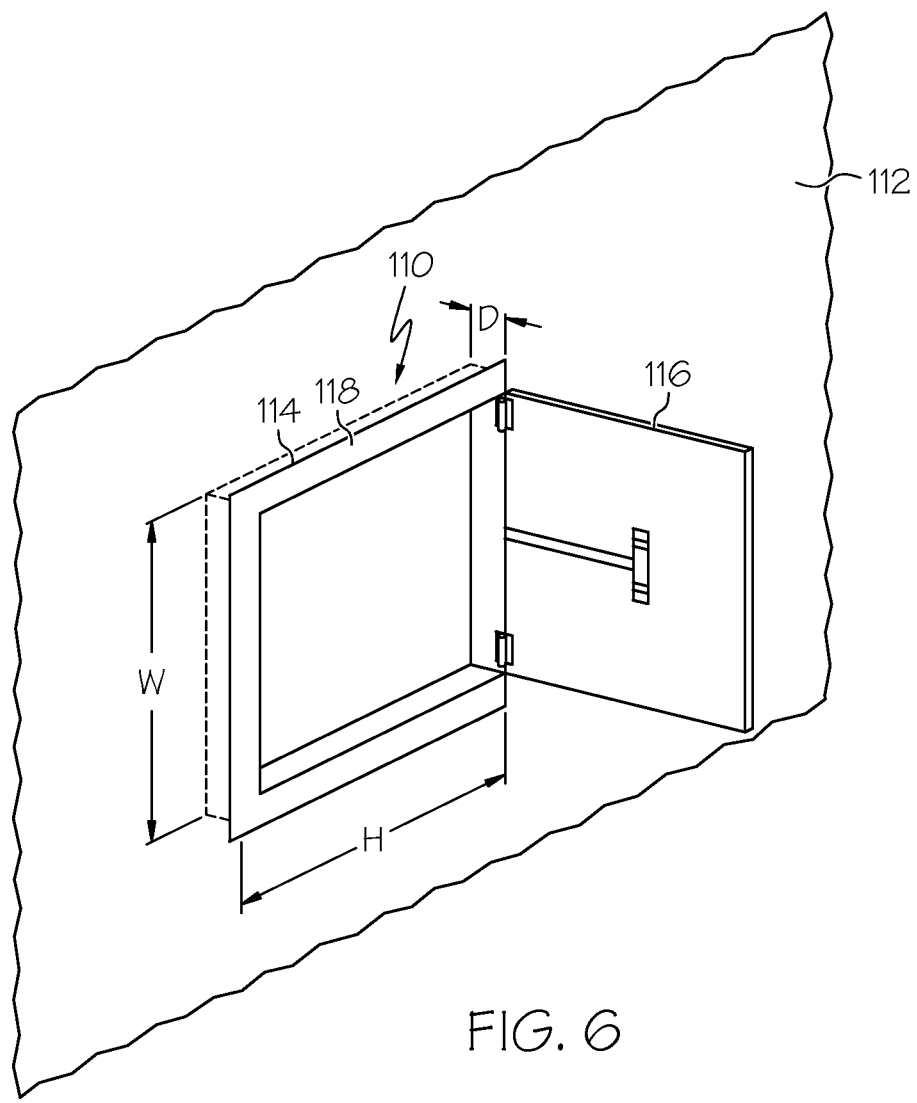
FIG. 6 is a perspective view of another charging station in an open configuration according to one or more embodiments shown and described herein.
Figure 7:
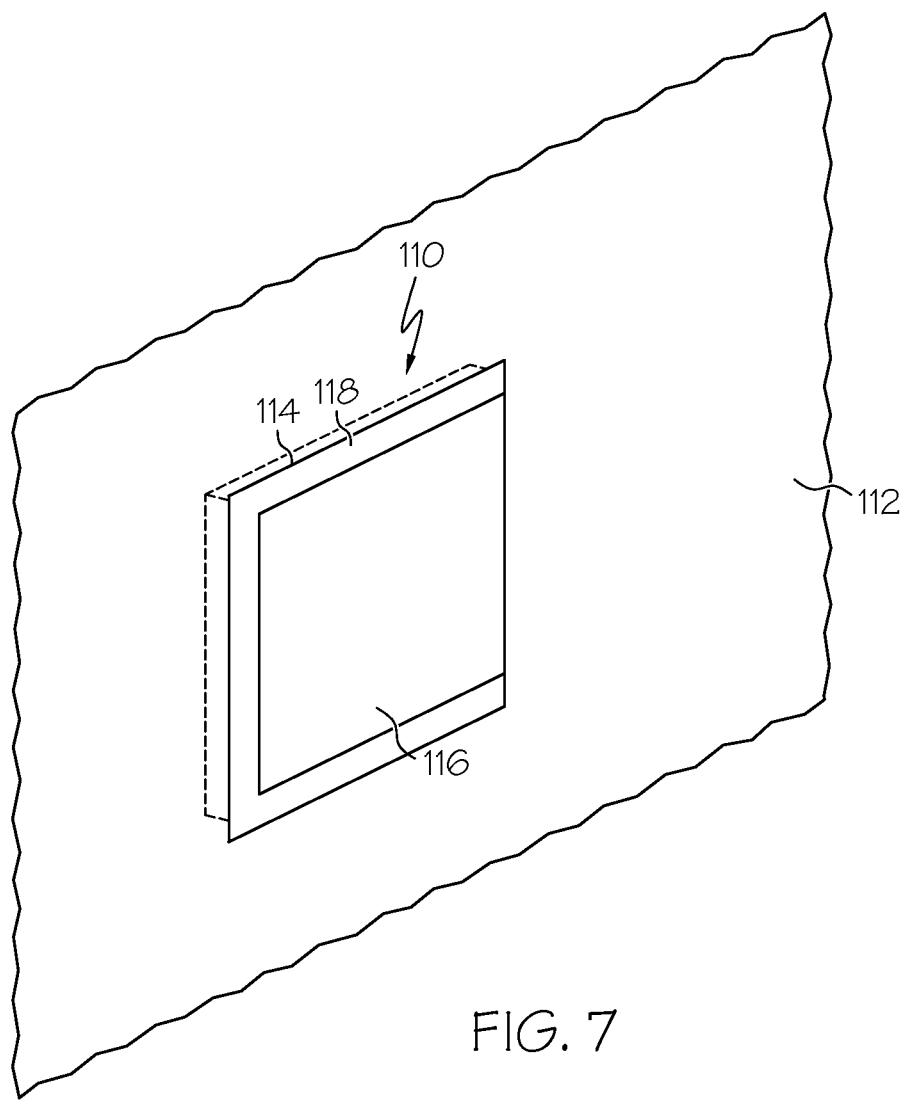
FIG. 7 is a perspective view of the charging station of FIG. 6 in a closed configuration.

While the description above of the charging station 14 focuses on a wall-mounted charging station, the charging station 14 may be mounted at other locations. Referring to FIGS. 6 and 7, a charging station 110 is illustrated mounted in a ceiling 112. The charging station 110 may include many of the same components described above with regard to the charging station 14 including a housing 114 and a moveable barrier 116 (e.g., a gate, door, etc.) that is moveable relative to the housing 114 between open and closed configurations. In FIG. 6, the moveable barrier 116 is illustrated in the open configuration with the moveable barrier 116 extending downwardly toward the floor. In other embodiments, the moveable barrier 116 may open by sliding the moveable barrier. The housing 114 has a height H, a width W and a depth D where the depth D of the housing 114 is at least partially recessed into the ceiling 112. In some embodiments, a flange 118 may be seated against the ceiling 112 to provide a support structure for supporting the charging station 110 on the ceiling 122. For example, in one embodiment, the charging station 110 may be sized and configured to mount between removable ceiling tiles.

Figure 8:
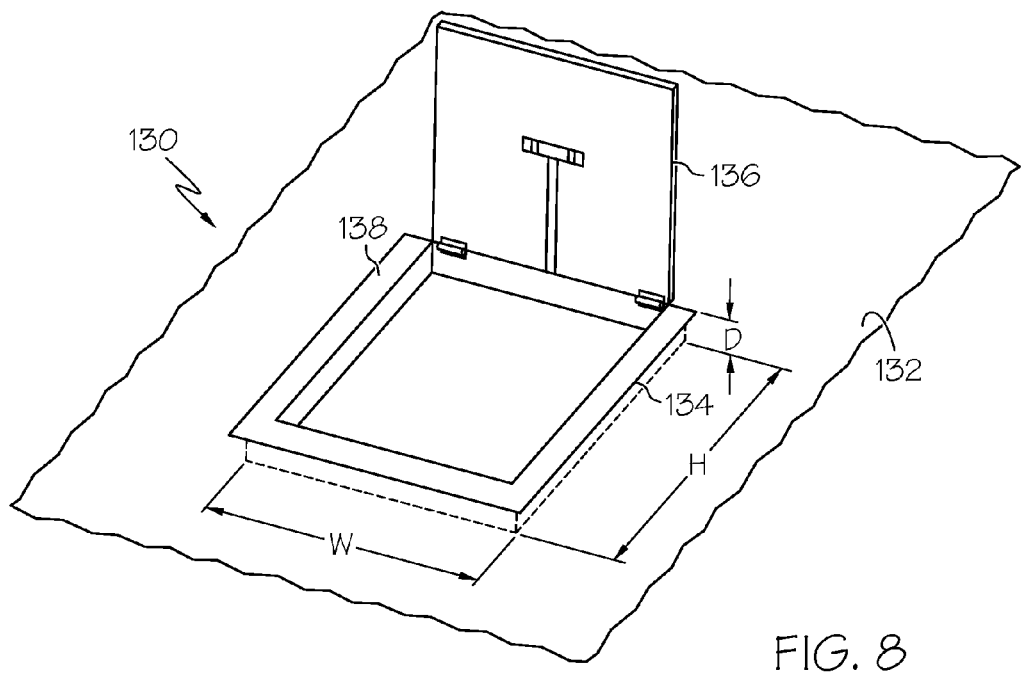
FIG. 8 is a perspective view of another charging station in an open configuration according to one or more embodiments shown and described herein.
Figure 9:
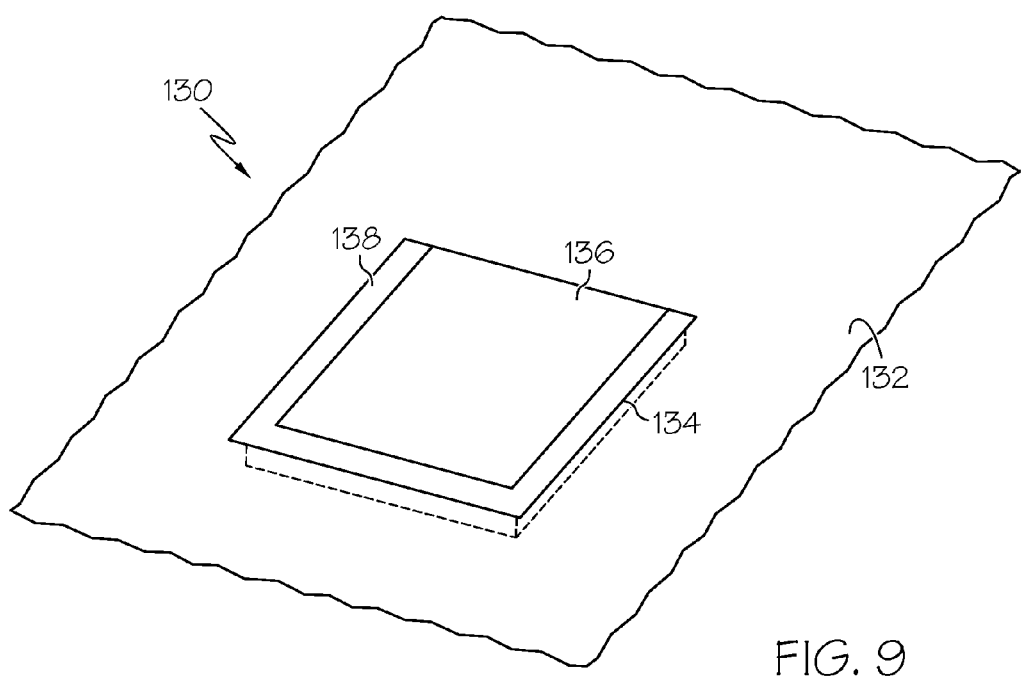
FIG. 9 is a perspective view of the charging station of FIG. 8 in a closed configuration.

Referring to FIGS. 8 and 9, a charging station 130 is illustrated mounted in a floor 132. The charging station 130 may include many of the same components described above with regard to the charging stations 14 and 110 including a housing 134 and a moveable barrier 136 (e.g., a gate, door, etc.) that is moveable relative to the housing 134 between open and closed configurations. In FIG. 8, the moveable barrier 136 is illustrated in the open configuration with the moveable barrier 136 extending upwardly toward the ceiling. In another embodiment, the moveable barrier 136 may pivot about 180 degrees to sit against the floor 132. The housing 134 has a height H, a width W and a depth D where the depth D of the housing 134 is at least partially recessed into the floor 132. In some embodiments, a flange 138 may be seated against the floor 132 to provide a support structure for supporting the charging station 130 on the floor 132.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of charging a robotic device using a charging station, the method comprising:
    signaling a controller of the charging station configured to control actuation a moveable barrier of the charging station from a closed configuration to an open configuration, the charging station being recessed into a wall, ceiling and/or floor; and
    actuating the moveable barrier from the closed configuration to the open configuration thereby exposing an electrical contact of the charging station configured to engage a charging contact of the robotic device for a charging operation;
    and detecting a presence of an obstacle using an obstacle sensor, the obstacle sensor providing an indication to the controller of the charging station if an obstacle is detected.

2. The method of claim 1 comprising detecting presence of the obstacle prior to actuating the moveable barrier using a non-contact sensor.

3. The method of claim 1 comprising detecting presence of the obstacle when the moveable barrier contacts the obstacle using a contact sensor.

4. The method of claim 1, wherein the step of actuating the moveable barrier includes pivoting the moveable barrier.

5. The method of claim 1, wherein the step of actuating the moveable barrier includes sliding the moveable barrier.

6. The method of claim 1 further comprising the robotic device engaging the electrical contact of the charging station with the charging contact carried by the robotic device.

7. The method of claim 6, wherein the electrical contact of the charging station is located on an interior surface of the moveable barrier.

8. The method of claim 1, wherein the charging station comprises a housing having a depth that is recessed into the wall, ceiling and/or floor about 50 percent or more.

9. A robotic system, comprising: a robotic device including a controller and a charging contact; and a charging station comprising:
    a housing configured to be recessed into a wall, floor and/or ceiling;
    a mounting structure for mounting the housing to the wall, floor and/or ceiling;
    a moveable barrier having a closed configuration where an electrical contact of the charging station is at least partially enclosed within the housing preventing access to the electrical contact by the robotic device and an open configuration allowing access to the electrical contact by the robotic device;
    a station controller that actuates the moveable barrier from the closed configuration to the open configuration; and
    an obstacle sensor that provides an indication to the station controller if an obstacle is detected.

10. The robotic system of claim 9, wherein the controller of the robotic system is configured to signal the station controller of the charging station to initiate a barrier actuation sequence.

11. The robotic system of claim 9, wherein the electrical contact is located on an interior surface of the moveable barrier.

12. A method of assembling a charging station for a robotic device, the method comprising:
    mounting a moveable barrier to a housing of the charging station; operatively connecting an actuator to the moveable barrier to move the moveable barrier from a closed configuration where an electrical contact for a robotic device charging operation is at least partially enclosed within the housing and an open configuration where the electrical contact is exposed for engaging a charging contact of the robotic device and
    providing the charging station with an obstacle sensor configured to detect the presence of an obstacle, the obstacle sensor providing an indication to a controller of the charging station if an obstacle is detected.

13. The method of claim 12, wherein the obstacle sensor is a non-contact sensor for detecting presence of the obstacle prior to actuating the moveable barrier.

14. The method of claim 12, wherein the obstacle sensor is a contact sensor for detecting presence of the obstacle when the moveable barrier contacts the obstacle.

15. The method of claim 12, wherein the actuator pivots the moveable barrier between the open and closed configurations.

16. The method of claim 12, wherein the actuator slides the moveable barrier between the open and closed configurations.

17. The method of claim 12, wherein the electrical contact of the charging station is located on an interior surface of the moveable barrier.

* * * * *